United States Patent
Van Kuilenburg

(10) Patent No.: US 11,252,935 B2
(45) Date of Patent: Feb. 22, 2022

(54) FEED CONTROL SYSTEM, FEEDING SYSTEM AND METHOD FOR FEEDING ANIMALS

(71) Applicant: Lely Patent N.V., Maassluis (NL)

(72) Inventor: Jan Martinus Van Kuilenburg, Wadenoyen (NL)

(73) Assignee: Lely Patent N.V., Maassluis (NL)

(*) Notice: Subject to any disclaimer, the term of this patent is extended or adjusted under 35 U.S.C. 154(b) by 921 days.

(21) Appl. No.: 14/374,022

(22) PCT Filed: Dec. 18, 2012

(86) PCT No.: PCT/NL2012/050898
§ 371 (c)(1),
(2) Date: Jul. 23, 2014

(87) PCT Pub. No.: WO2013/112042
PCT Pub. Date: Aug. 1, 2013

(65) Prior Publication Data
US 2015/0034014 A1 Feb. 5, 2015

(30) Foreign Application Priority Data

Jan. 26, 2012 (NL) ...................................... 2008185
Aug. 15, 2012 (NL) ...................................... 2009325

(51) Int. Cl.
*A01K 5/02* (2006.01)
*A01K 1/10* (2006.01)

(52) U.S. Cl.
CPC ................ *A01K 1/105* (2013.01); *A01K 5/02* (2013.01)

(58) Field of Classification Search
CPC ...... A01K 5/0275; A01K 5/0233; A01K 5/02; A01K 1/105
(Continued)

(56) References Cited

U.S. PATENT DOCUMENTS 4,195,594 A * 4/1980 Siciliano .............. A01K 5/0258
119/57.6
4,223,638 A * 9/1980 Sappington .......... A01K 5/0258
119/57.6
(Continued)

FOREIGN PATENT DOCUMENTS

AT        006 016 U1    3/2003
DE        203 14 986    3/2005
(Continued)

OTHER PUBLICATIONS

Written Opinion of the International Searching Authority dated Apr. 15, 2013 in PCT/NL12/050898 Filed Dec. 18, 2012.
(Continued)

*Primary Examiner* — David J Parsley
*Assistant Examiner* — Danielle A Clerkley
(74) *Attorney, Agent, or Firm* — Oblon, McClelland, Maier & Neustadt, L.L.P.

(57) ABSTRACT

A feed control system, a feeding system and a method for feeding animals comprises an autonomous feed displacer which displaces animal feed and subsequently measures the height of the displaced animal feed using a feed level meter. Since the displaced, pushed back animal feed results in heaps of surprisingly constant shape, it is possible to obtain a reliable indication of the quantity using only the feed level.

33 Claims, 3 Drawing Sheets

(58) Field of Classification Search
USPC ........ 119/51.01, 53, 57.1, 57.5, 57.91, 57.92
See application file for complete search history.

(56) References Cited

U.S. PATENT DOCUMENTS

| | | | | |
|---|---|---|---|---|
| 5,309,864 | A * | 5/1994 | Harmsen | A01K 5/0266 119/51.02 |
| 5,816,192 | A * | 10/1998 | van der Lely | A01K 5/00 119/57.92 |
| 6,779,486 | B2 * | 8/2004 | Vaags | A01K 61/80 119/51.02 |
| 2006/0170385 | A1 * | 8/2006 | Cooper | A01K 1/105 318/568.11 |
| 2010/0031891 | A1 * | 2/2010 | Sie | A01K 5/0266 119/53 |
| 2010/0126423 | A1 * | 5/2010 | Van Den Berg | B66C 3/02 119/57.92 |
| 2010/0326363 | A1 | 12/2010 | Van Den Berg | |
| 2011/0132267 | A1 * | 6/2011 | Tabakman | A01K 5/02 119/57.92 |
| 2011/0185975 | A1 * | 8/2011 | Van Den Berg | A01K 1/01 119/57.92 |

FOREIGN PATENT DOCUMENTS

| | | |
|---|---|---|
| EP | 2 007 191 B1 | 9/2009 |
| EP | 2 064 944 B1 | 2/2011 |
| WO | WO 2007/040388 A1 | 4/2007 |
| WO | WO 2007/120036 A1 | 10/2007 |
| WO | 2008 097080 | 8/2008 |
| WO | WO 2008/123820 A1 | 10/2008 |
| WO | WO 2009/125390 A2 | 10/2009 |
| WO | 2010 044656 | 4/2010 |

OTHER PUBLICATIONS

International Search Report dated Apr. 15, 2013 in PCT/NL12/050898 Filed Dec. 18, 2012.

* cited by examiner

FEED CONTROL SYSTEM, FEEDING SYSTEM AND METHOD FOR FEEDING ANIMALS

The present invention relates to a feed control system, a feeding system and to a method for feeding animals.

In general, the invention relates to feeding animals. Consideration may in this case be given to feeding, for example, dairy animals, but also to meat animals and the like. These animals receive, for example, roughage at a feeding table or feeding fence. While eating, the dairy animals will spread part of the animal feed in such a way that this is eventually out of their reach. It is then the task of the farmer to move this feed back so that it is once again within reach of the dairy animals. This used to be carried out by hand in the past, which was very labour intensive. Nowadays, there are a few known systems which carry out this task automatically, such as the Lely Juno feed pusher. In this case, an autonomous vehicle travels along a path along the animal feed and pushes it back.

A drawback of automating this task of pushing back feed is that the farmer does not see how much animal feed is still present and how this is distributed. In order to overcome this drawback, feeding systems have been disclosed per se in which a measuring system is provided on the feed wagon which measures the amount of animal feed which is still present. Thus, WO2008/097080 discloses a feed-mixing wagon with a detection means, such as a 3D camera or ultrasonic sensor, for detecting the amount of feed present on a surface.

Nevertheless, there are still drawbacks to said systems. A self-propelled feed-mixing wagon of the known kind has a drawback that it measures while moving, whereas said moving is not always necessary, for example, when there is still sufficient animal feed. After all, it is also important not to provide too much or too little animal feed. In case of an excess of animal feed, the quality may prematurely deteriorate which is undesirable. However, a shortage of animal feed may result in loss of production. It is therefore very important to determine the amount of animal feed as accurately as possible. In addition, the prior-art feed-measuring means provided, if they are elaborated on in more detail, are often unnecessarily complicated and therefore susceptible to failure.

It is an object of the invention to provide an animal feeding system which can at least partly overcome the abovementioned drawback.

To this end, the invention provides an animal feeding system according to claim 1, comprising an autonomous feed displacer which can be displaced in a desired direction of displacement which is configured to displace said animal feed at right angles to the direction of displacement when passing a site containing animal feed provided on the ground, a feed level meter which is configured to measure a feed level of the animal feed displaced by the feed displacer and to emit a feed level signal on the basis of the measured feed level.

The invention is based on the insight that it is possible, in particular using the feed displacer, to obtain useful information about the amount of feed in a surprisingly simple manner, which information can then be processed and used when feeding the animals further, if desired by hand or using other devices. Surprisingly, the inventors have discovered that the feed which is displaced at right angles to the intended direction of displacement virtually always has the same shape. It is assumed that this is caused by the fact that the displacement results in the animal feed being distributed across a much smaller, but also, and still more importantly, across a fixed width. As a result of the unambiguous shape, it is much simpler and thus often less expensive and more reliable to determine the amount of feed by only measuring the height thereof. It should be noted that in the prior art, the measuring method used is not or hardly elaborated on, and in those cases where it is explained, it comprises using optical 3D and/or ultrasound techniques which require a large amount of computing power. In addition, the fact that some of the measured animal feed could be beyond reach of the animals and thus should not be counted towards the amount of feed which is actually available has not been taken into account anywhere. After all, it is not pushed back or otherwise displaced before measuring takes place. However, this can be ensured in a simple manner with the system according to the present invention.

In this context, the feeding system is understood to mean a system which can make feed available to animals. This includes a system which only pushes feed in the direction of the animals, since feed which was beyond the reach of said animals before can now be made available to these animals. The animal feed may also be dispensed by the system itself, provided it is at least slightly displaced, pressed or formed in a similar manner and thus also has a more or less fixed shape.

Advantages of the present invention are, inter alia, that it is possible to ensure in a very simple and reliable manner that sufficient fresh feed is available to the animals all the time, or at least more often than usual. In addition, it is possible, in a more efficient way, to prevent feed from rotting, since it is prevented that more feed is provided than is necessary. It should be noted that these advantages apply in particular to roughage, such as grass-like and hay-like products, which have to be pushed back occasionally. Obviously, this is not necessary when providing feed such as concentrate or slop feed in a trough or the like. In principle, this feed always remains within reach and therefore available, and due to the fact that it is granular or (semi) liquid, a level measurement suffices in this case. Something like this cannot be applied to the elongate or even stalk-like animal feed to which the present invention relates in particular without additional measures. Furthermore, it should also be noted that the expression at right angles to the direction of displacement actually means that the feed is not only carried along in the direction of displacement. After all, any direction other than the intended direction of displacement, into which other direction the animal feed is being displaced, can be disintegrated into a component parallel to the intended direction of displacement and a component at right angles to the intended direction of displacement.

Particular embodiments of the feed control system according to the invention are described in the subclaims.

In particular, the invention provides a feed control system wherein the feed level meter is configured to measure the feed level within a predetermined distance and/or time after the feed displacer has passed. This ensures that the animals which will eat the animal feed do not have sufficient time to displace said animal feed again, so that the roughly fixed shape is not lost. The predetermined distance may, for example, be chosen based on the animal species and/or the type of feed. A useful distance is, for example, between 5 and 100 cm, in particular between 10 and 40 cm. This distance also depends on the speed of the feed displacer, with a higher speed of the feed displacer making a larger predetermined distance possible. The predetermined time can also be chosen based on the animal species and/or type of feed, and is, for example, between 1 and 30 s, preferably between 1 and 5 s.

In embodiments, the feed level meter can be displaced autonomously along a track, wherein a displacement of the feed level meter is coupled to a displacement of the feed displacer. In this embodiment, the feed level meter can also be displaced autonomously, to which end, for example, a rail system can be used. The feed level meter may in this case have its own drive mechanism or the drive mechanism may also be coupled to that of the feed displacer, for example, via an optionally elastic connecting element or, for example, via a magnetic coupling. In this embodiment, the point is that the feed level meter can measure the feed level of the displaced and not yet scattered animal feed. By now coupling the displacement of the feed level meter and the feed displacer, it is relatively simple to satisfy this requirement.

In embodiments, the feed displacer and the feed level meter form a rigidly connected unit. In this case, the feed level meter is fixedly connected to the feed displacer and thus forms a single entity therewith. Of course, this is a simple and reliable way to couple the displacement of the feed displacer and the feed level meter. The feed level meter may, for example and even advantageously, be provided on the feed displacer.

Alternatively, the feed level meter comprises a series of part meters along a track. By providing a series of part meters, a displaceable feed level meter can be simulated, in which, for example, all part meters can determine the feed level one after the other or, if desired, simultaneously. It should be noted that, for example, in a case in which the animals (temporarily) have no access to the feed and there is therefore no risk of the animal feed being scattered, there is no need to measure the feed level within a predetermined distance and/or time after the feed displacer has passed. In such a case, the feed level can also be determined at any point in time prior to the release of the feed or, for example, also simultaneously along the desired distance or track. In cases where the animals are not being kept away from the animal feed, it remains important to measure the feed level sufficiently quickly after the feed displacer has passed. In particular, the part meters are configured to measure the feed level within a predetermined distance and/or period of time after the feed displacer has passed. To this end, it is possible, for example, for the feed displacer and the part meters to communicate with each other, in which the part meters measure the feed level in time and emit or store an associated feed level signal. An advantage of the embodiment using a plurality of part meters is that the feed level meters have no moving parts, which may improve reliability. In addition, it is still possible to collect relevant feed level information, even if one or a few part meters fail.

Advantageously, the feed level meter comprises a measuring system for determining the feed level at one point at a time, in particular along a track. On the basis of the view of the inventors that in particular the pushed-back pile of animal feed has a more or less fixed shape, it is sufficient to determine the feed level at only one point at a time. By determining the feed level, it is then simple to calculate the amount of animal feed, using the knowledge of the shape of the pile of feed which is uniform in principle. In practice, there is a clear and simple correlation between the amount and feed level. For example, a feed level which is twice as high could indicate that the amount of feed is 2.5 times greater. Incidentally, it is then also sufficient to determine only the feed level, without converting this to the amount of feed. It will be clear that determining the feed level at one point at a time can be carried out in a relatively simple, reliable and accurate manner. Further particulars are also described below.

In particular, the feed level is measured at a plurality of points in succession, with the points being situated along a track. Of course, it is always possible to establish a track by connecting the points, but, in particular, this track coincides with or is substantially parallel to the track of the feed displacer. Thus, the points at which the feed level is determined are always in (approximately) equal positions with respect to the displaced animal feed. This ensures good correlation between the measured feed level and the amount of animal feed situated there.

Alternatively and/or additionally, the feed level meter is configured to measure the feed level at different points simultaneously in order to determine the greatest height. This does not mean that a number of points are chosen along a track in order to determine the greatest height thereof, but that a number of different points in a relatively small and coherent area are measured in order to be able to determine the local feed level locally, from a "surface area" formed thereby as a maximum height of said "surface area". The feed level meter is therefore configured to determine the feed level from a surface area analysis on the basis of different measured points. Such an analysis can then be repeated at various locations. An advantage of this embodiment is that it is less dependent on the exact position of the feed level measurement. However, it is a drawback that an advantage of the general invention, i.e. the simplicity, is slightly lost. Incidentally, it is possible to measure the various points simultaneously using, for example, optical or ultrasonic 3D techniques. However, it remains advantageous that only one parameter, the feed level, is necessary for the further processing, such as calculating the amount of feed.

In advantageous embodiments, the feed level meter comprises a laser distance meter. Such a laser distance meter is a very accurate and reliable means of determining the feed level. In addition, the use of a laser beam has the advantage that the laser beam, obviously depending on the wavelength, is visible to the user, so that he/she can readjust the location where the measurement takes place. Alternatively and/or additionally, the feed level meter comprises a mechanical sensor or an ultrasonic meter. A mechanical sensor has the advantage of being simplest, but it has to be flexible, as a result of which the reliability cannot always be ensured. An ultrasonic sensor is a technique for measuring a distance which is also used a great deal and could, for example, be combined with a light beam, such as a laser beam, in order to indicate the position of the measurement. However, other distance-measuring devices known in the prior art are not excluded.

In a particular embodiment, the feed displacer comprises a drivable rotatable annular element. More particularly, this annular element is a rotatable skirt according to EP2007191 or EP2064944. The feed displacer described therein is commercially available under the name Lely Juno. The rotatable skirt which may be driven by friction with the floor or by a motor displaces the feed laterally. For further details and advantages of this embodiment, reference is expressly made to the cited documents. Alternatively, the feed displacer comprises a displaceable rigid pusher. Such a pusher can be displaced, for example, by means of a chain or rope, in which case the pusher is at an angle with respect to the animal feed to be displaced. Such a pusher then resembles a snow plough.

Furthermore, embodiments are provided in which the feed level meter is configured and positioned to determine the feed level at a predetermined position with respect to the feed displacer. In this case, it is advantageous that the feed level meter can always measure the feed level at a fixed location with respect to the feed displacer. In this case, optimum use is made of the insight of the invention that the displaced feed will generally have the same shape. After the feed displacer has pushed back the animal feed, the animal feed will therefore have this shape. When the feed level meter subsequently determines the feed level, this can be achieved in a reliable and simple manner. Obviously, it is advantageous if said fixed location at least approximately corresponds to the top of the pile of displaced animal feed. It is therefore also alternatively or additionally advantageous if the predetermined position is situated substantially at the top of the displaced amount of animal feed. To this end, it is, for example, possible to carry out measurements beforehand, in order to determine within which predetermined positions the top can be reliably determined, that is to say within a predetermined margin of error. In other words, it is thus possible to determine an area for the predetermined position inside which the top can be measured or at least a value for the feed level which is within a predetermined margin of error from the top value. In practice, it has been found that the pushed-back feed has a substantially similar shape, irrespective of the actual amount of feed. The predetermined position for the measurement, preferably thus the top, is also usually situated in the same position, both with respect to the pile of animal feed itself and with respect to the feed displacer. It should be noted that it is not necessary to determine the greatest height of the displaced animal feed. It is sufficient if a substantially constant part of the height can be determined, such as half the height. Thus, the correlation between the amount of feed and the measured value for the height is maintained. Therefore, it may be sufficient not to measure the absolute top of the pile of animal feed, but, for example, a point on the slope.

In particular, the feed displacer has a widest point which is intended to come in to contact with the animal feed, wherein the predetermined position, as viewed in a plane at right angles to the intended direction of displacement, is a predetermined distance, in particular between 15 and 30 cm, from, that is to say wider than, the widest point. By thus determining the predetermined position with respect to the feed displacer as a predetermined distance beyond the widest point of the feed displacer which comes into contact with the animal feed, an advantageous and reliable measuring position is determined, as has been found in practice. Although other distances are not excluded, for example, for types of feed other than grass-like and/or hay-like types of feed, a very small distance of, for example, a few centimetres appears disadvantageous. Without wishing to be bound to a certain explanation, the inventors think that this is caused by the animal feed "settling". This means that, after displacement by the feed displacer, the animal feed may undergo a certain degree of subsidence or settling, for example, on account of the force of gravity or a spring force which is inherent to the animal feed. Although the overall shape of the displaced pile of animal feed will still be substantially constant, it will not always be possible to determine the height with a sufficient degree of reliability at such a short distance from the widest point of the feed displacer. It is therefore preferable to stay at some distance therefrom, such as between 15 and 30 cm. At an increasingly greater distance, the correlation between the measured feed level and the "actual" feed level will decrease, since pushing back then has relatively less influence on the overall shape of the pile of animal feed. It has been found that it is possible to achieve reliable results at the indicated predetermined distance, as well as when using when displacing grass-like or stalk-like animal feed for dairy cows.

Embodiments are provided which are characterized by the fact that the feed displacer comprises a bumper which preferably extends around the feed displacer, wherein the feed level meter is arranged on a part of the bumper which extends at least to the displaced animal feed. For safety reasons, it is advisable to provide a bumper on the feed displacer. Thus, it is possible to efficiently prevent dangerous situations when colliding with people, animals or objects. By, in addition, fitting the feed level meter on the bumper, obviously on a part of the bumper which is suitable for the purpose, the feed level meter can simply be fitted in such a manner that the feed level measurement can be performed reliably. In addition, it is thus possible to provide already existing feed displacers with such a feed level meter. In addition, the feed level meter is efficiently protected by the bumper function of the bumper. In particular, the feed level meter, especially a laser distance meter, is fitted in a recess. As a result of the recess which will obviously extend so as to be open towards the bottom, the measurement path of the feed level meter is efficiently protected against soiling and damage by animals and the like. In particular, the laser distance meter is arranged in a tube. In this case, the tube will extend parallel to the laser beam.

In a particular embodiment, the feed control system is furthermore provided with a feed storage container and a feed dispensing device, configured to dispense feed from the feed storage container. By providing such a feed storage container and dispensing device, it is possible to directly replenish animal feed at the locations where this is necessary, based on the measured feed level and thus of the indicated amount of feed. Such feed storage containers and feed-dispensing devices are, for example, known from feed-mixing wagons, which are known from the prior art.

In particular, the feed control system comprises a control circuit which is configured to process the feed level signal. The control circuit is, for example, configured to process the feed level signal to determine a local amount of feed or to process it further to determine a desired amount of feed to be dispensed. The latter may, for example, be calculated by subtracting an amount of feed which is present from an amount of feed which is desired. The control circuit could also be configured to have a reference table in which a specific measured feed level corresponds to an amount of animal feed to be dispensed. In short, a feed level threshold value can be used on the basis of which it is determined whether and how much animal feed has to be dispensed. All this may be transmitted to a central management program or, for example, to a control circuit of a separate feed-dispensing device. If the feed control system itself is provided with a feed storage container and a feed-dispensing device, it is also possible to use the processed feed level signal when dispensing feed from the feed storage container. Therefore, a particular embodiment is characterized by the fact that the control circuit is configured to determine an amount of feed to be dispensed on the basis of the processed feed level signal, in particular for each distance. This has the advantage that feed rations can be dispensed by location, which means that groups of animals can each be provided with a certain feed ration. After all, it is customary to house animals, such as dairy animals, in locations, such as animal sheds with feed alleys, in which a feeding table or feeding fence is situated on one or both sides of the feed alley and in which groups of animals have access to a certain feeding fence or part of a feeding fence. In a dairy farm with a milking robot, a robot location, for example, is that part of the animal shed with the associated feed alley and feeding fence, in which the animals which are housed there have access to a robot. Another location is, for example, the location for young cattle or a location for dry cattle, which is typically a part of the animal shed having a feed alley and a section of a feeding fence in said alley to which then only young cattle or the dry cattle have access. The control circuit may also be self-teaching, for example, by measuring the height of a poured and displaced amount of feed. Thus, a connection can be determined between the (total or local) amount of feed determined from the measured feed level and the total amount of feed which has been poured. These totals obviously have to correspond. This is done most accurately if there is no feed present at the start, so that no feed can have been consumed by the animals.

It is also possible for the control circuit to be configured to determine an average of the measured feed level and/or of the measured feed level as a function of the position at which measurement has taken place. By determining the average feed level, it is easy to determine a total amount of feed and subsequently a total amount of feed to be dispensed. If variations in the local feed level are accepted, it is then readily possible to replenish the total amount of animal feed as desired by, for example, dispensing animal feed at a constant dispensing speed as a function of the location.

It should be noted that determining the feed level locally may result in an amount of feed to be dispensed which has also been determined locally. In this embodiment, as with all other embodiments in which the feed level is determined at a plurality of locations, the feed level can be determined as a (virtually) continuous function or, for example, by measuring at predetermined locations or at locations with a predetermined intermediate distance. It is also possible to determine the amount of feed to be dispensed as a total value, in which the (subsequent) dispensed amount is uniform, but overall equal to the amount of animal feed to be dispensed which has been determined. However, other possibilities of dispensing feed are not excluded.

In embodiments of the feed control system provided with a feed-dispensing device, the control circuit is configured to control the feed-dispensing device so as to dispense the amount of feed to be dispensed, in particular for each distance. Thus, the feed control system can, while passing the animal feed, move the latter towards the animals, measure the height thereof and, either immediately or at a subsequent passing, replenish it for each distance by dispensing a certain amount of feed for each distance. It should be noted that the distance in this case may correspond to the length of a part of a feeding fence to which a certain group of animals has access, such as a robot location at a dairy farm. Groups of animals can in this way be fed separate rations. This is due to the fact that once the feed level of all locations in all feed alleys has been measured, a feed ration can be dispensed at a subsequent passing for a certain location and thus over a certain distance which corresponds to a group of animals. In this case, use is obviously made of the measured feed level. On the basis of the measured feed levels at the various locations, the feed control system can also determine to which of these locations feed is dispensed at the next passing and which ration. The location at which, for example, the measured feed level is furthest below the desired feed level and thus at which the measured feed level is furthest below the feed level threshold value, or the total amount of feed, as the product of feed level and feed length, is furthest below the minimum desired amount of feed, can be provided with feed first. Dispensing could, for example, be achieved by the fact that the feed-dispensing device has different feed-dispensing speeds. This could, for example, take place by opening a feed-dispensing opening to a greater or lesser extent. In particular, however, the control circuit is configured to control a displacement speed of the feed displacer. As a result of the fact that, in this embodiment, the feed displacer supports the feed storage container and the feed-dispensing device, this will also be provided with a controlled displacement speed. In this way, it is possible to vary the amount of feed which is dispensed as a function of the location by varying the displacement speed, even if the feed-dispensing speed is substantially constant. Thus, the dispensed amount of feed can be controlled as a function of the location, in order to thus arrive at a desired total amount of feed. In this case, it should be noted that it is not necessary to combine measuring the feed level and providing/pouring feed in one vehicle. It is also possible, for example, for one vehicle to perform the displacement and feed level-measuring function and for another vehicle to provide the feed or to provide the feed by hand. Obviously, it is then possible to use information on the basis of the feed level signal. Thus, it is possible in large animal sheds with a plurality of feed alleys to have a small vehicle for pushing feed and measuring the feed level in each feed alley, while a larger vehicle, such as a feed-mixing wagon, is used to supply feed as often as is necessary. In this way, feed is always made available by pushing it back, and the small vehicles check that no (local) shortage of feed occurs by warning the feed-mixing wagon or the like in time.

As a result thereof, it is possible to determine the amount of feed present and, if desired, the amount of feed to be dispensed even more accurately, in which these data are made available to a feed-dispensing device. Said feed-dispensing device is then either a separate, that is to say autonomous feed-dispensing device, or coupled to the feed control system according to the invention.

The invention also provides a feeding system, comprising a feed control system according to the invention, and a feeding fence, in which the feed control system is configured to move over a track along the feeding fence. A feeding fence is a very common device at which animals can be fed, which device has the drawback that the animals can easily disperse the animal feed provided. Therefore, a feeding system according to the invention will clearly have the advantages which have already been described above. In particular the feed pusher is then configured to move along the feeding fence, either along a predetermined track or by orienting itself by means of the feeding fence. Thus, it is, for example, simple to move the dispersed animal feed in the direction of the feeding fence. It should be noted that in this context, the term "feeding fence" may be any fence behind which animals can be kept, which are then confined in a space or in an area by the fence, but are able to reach the feed through the latter. In that case, the feeding fence may be a traditional feeding fence, but may also, for example, be a fence of a meadow, an electrified fence, etc.

In addition, the invention provides a method for feeding animals, comprising displacing animal feed in a direction towards the animals using a feed control system which moves substantially at right angles to said direction, in particular according to the invention, and measuring the feed level of the displaced animal feed within a predetermined distance and/or time after the feed control system has passed. This method is based on the insight that the displaced animal feed has a uniform shape, so that measuring the height thereof is a very simple and reliable indication of the amount of feed. This information can then easily be used to adjust the amount of feed.

Particular forms of the present method follow from the particular forms of the feed control system according to the invention in a simple manner. The independent method claim can therefore also be combined with one or more features of the dependent feed control system claims.

A significant advantage of this method is the fact that it is possible to reliably ensure, by using very simple means, that the animals always have sufficient feed available, but not too much, so that feed can be prevented from rotting prematurely in an efficient way. In particular, the method also comprises the step of determining the decrease in the amount of feed over time, in particular as a function of the position. Thus, it is possible to determine whether animals find certain locations more attractive to eat at. Such locations are, for example, characterized by conditions which are climatologically more favourable. The feed intake over time can sometimes be so great that autonomous feed systems do not have sufficient capacity to be able to replenish the feed. Advantageously, the method then comprises the step of dispensing an amount of feed beyond an average desired level, all this in such a manner that the amount of feed which is dispensed in excess of the average desired level corresponds, at least substantially, to the degree to which the maximum consumption exceeds the maximum amount of feed dispensed by the feeding system.

The invention will be explained in more detail below with reference to the drawing, in which:

FIG. 1 diagrammatically shows a top view of a first embodiment of the feeding system according to the invention;

FIGS. 2a and 2b diagrammatically show a cross section of a feeding fence with non-displaced animal feed and displaced animal feed, respectively;

FIG. 3 diagrammatically shows a side view of another embodiment of the feeding system according to the invention;

Figure 1:
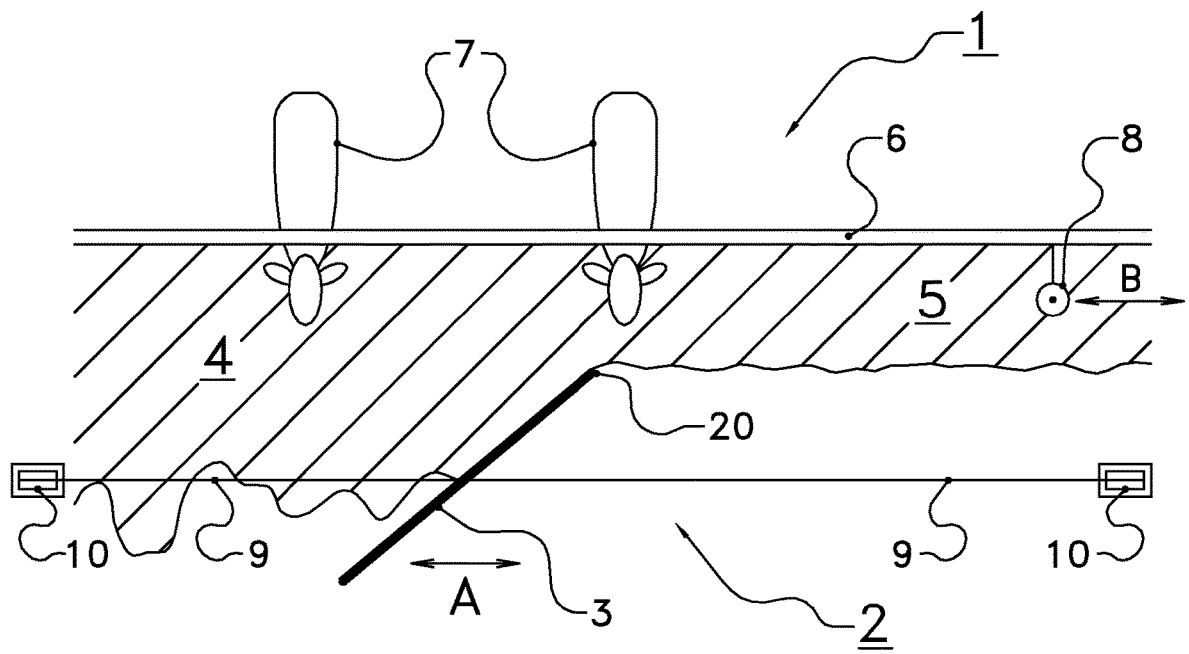

FIG. 1 diagrammatically shows a top view of a first embodiment of the feeding system according to the invention. The feeding system is generally denoted by reference numeral 1.

The system comprises a feed control system 2, a feed pusher 3 and a feed level meter 8. The feed pusher 3 displaces animal feed 4 laterally to form displaced animal feed 5.

The feed pusher 3 is moved along feeding fence 6, behind which animals 7 are situated. By means of cables 9, the feed pushed is connected to pulleys 10 which are used to displace the feed pusher 3 along the double arrow A. It can be seen that the non-displaced animal feed 4 may have an irregular distribution, while the displaced animal feed 5 has a clear delimitation between the feeding fence 6 and a line which is determined by the widest point 20 of the feed pusher 3. Above the displaced animal feed 5 which has been delimited in this way, a feed level meter 8 is situated, in this case, for example, a laser distance meter which is displaceable along the feeding fence 6 in the direction of the double arrow B.

When using the feeding system 1 according to the invention, the feed pusher 3 may, for example, be displaced in order thus to push together the animal feed 4 to form displaced animal feed 5. Subsequently, the feed level meter 8 may follow the same path as the feed pusher 3 in order thus to measure the feed level of the displaced animal feed 5 as a function of the position. In this case, it is advisable to ensure that the animals 7 are not (yet) able to move and disperse the displaced animal feed 5 again by their eating movements. Advantageously, the feed level meter 8 is therefore moved over the displaced animal feed 5 within a predetermined distance and/or time after the feed pusher 3 has passed. On the other hand, it is also advantageous to allow the displaced animal feed 5 to return to equilibrium, since it is possible, in practice, for the feed to settle slightly after the feed pusher 3 has passed. Therefore, an advantageous distance between the feed level meter 8 and the (width point 20 of) feed pusher 3 is greater than zero and is, for example, between 10 and 50 cm. This distance depends slightly on the speed of the feed pusher 3, with a lower speed requiring a smaller distance. A suitable time interval between passing of the feed pusher 3 and passing of the feed level meter 8 is, for example, between 1 and 5 seconds. However, in practice, different values may be chosen, both for the distance and for the time interval, for example, depending on the type of animal feed 4.

Figure 2A:
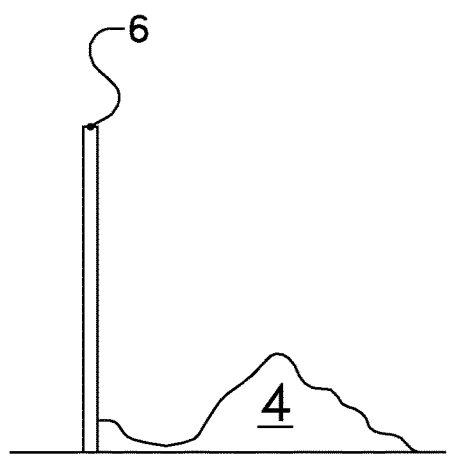
Figure 2B:
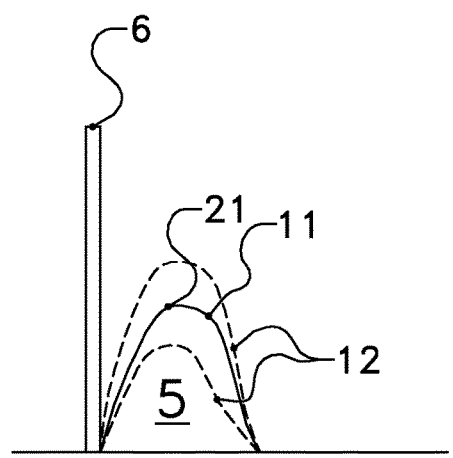

FIGS. 2a and 2b diagrammatically show a cross section of a feeding fence 6 with non-displaced animal feed 4 (FIG. 2a) and displaced animal feed 5 (FIG. 2b), respectively.

FIG. 2a shows non-displaced animal feed 4 in an irregular pile, with little animal feed 4 being present near the feeding fence 6. The visible pile is in fact mainly the result of the animals not being able to reach this animal feed 4. Incidentally, it is very likely that there is animal feed 4 at other locations which is within reach of the animals.

FIG. 2b diagrammatically shows displaced animal feed 5, a profile of which is illustrated by means of the solid line 11. This profile 11 has a highest point 21. In addition, alternative feed pile shapes are illustrated by means of dashed lines 12. These relate to other amounts of displaced animal feed 5. It will be clear that a smaller amount of animal feed results in a lower feed pile profile and vice versa. However, it should be noted that the general shape is virtually constant. Therefore, the position of the highest point 21 has a relatively direct relationship with the total amount of animal feed in the pile. After all, the boundaries of the feed pile of the displaced animal feed 5 are determined to a high degree by the feeding fence 6 and by the boundary of the feed pusher (not shown here). The result of all this is that the feed level meter (not shown either) in principle only has to determine the height of the (approximately) highest point 21 in order to determine the amount of feed. Since the highest point 21 will often be situated on a virtually flat portion of the feed pile, the exact position of the highest point as a measurement point is not critical. It should furthermore be noted that the highest point is determined each time at a single position, that is to say in a single transverse plane to the direction of forward movement. Thereupon, such a highest point can be determined as a function of the distance, uninterrupted or (for example) every 2 cm. Thus, a feed level is measured as a function of the distance travelled by the vehicle. From this, it is possible to determine the total amount of feed which is present, either by incorporating the local amount of feed measured per measured feed level, or by means of the measured feed levels and determining the total amount of feed from this average feed level. The first-mentioned option may be slightly more accurate, in particular if the relationship between feed level and amount of feed is not completely linear.

Figure 3:
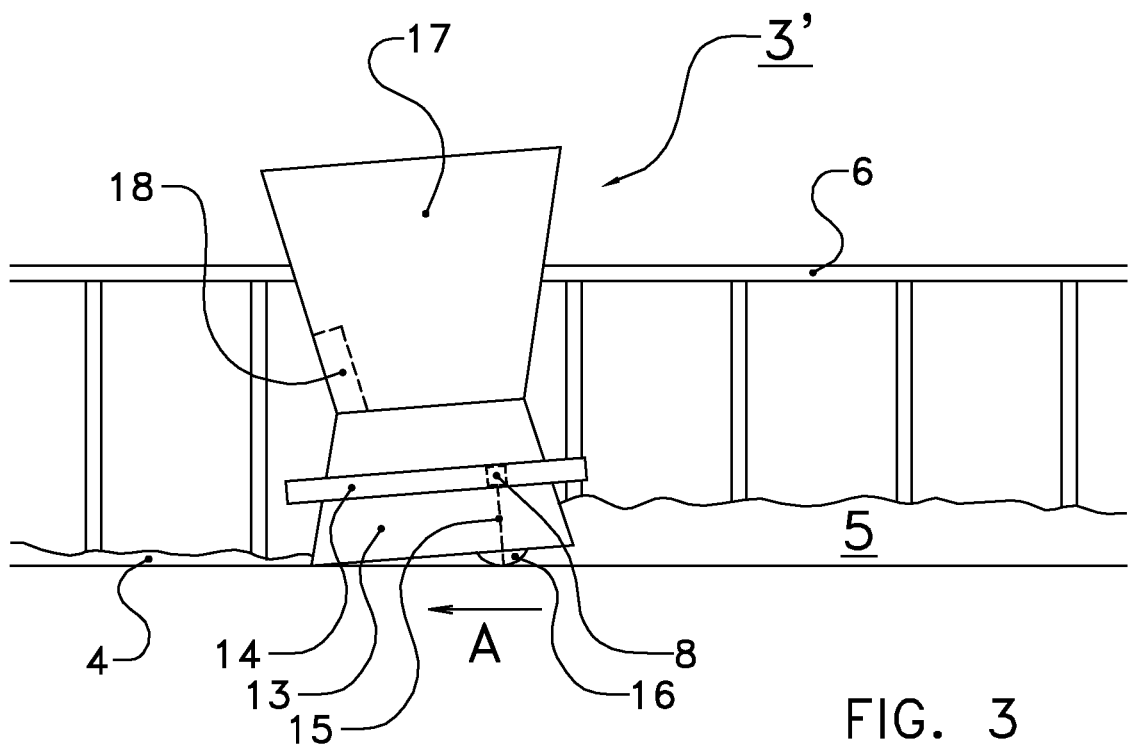

FIG. 3 diagrammatically shows a side view of another embodiment of the feeding system according to the invention. In this embodiment, a feed displacer, also referred to as a feed pusher, is denoted by reference numeral 3'. The feed displacer 3' is based on the Lely Juno Feed Pusher. It comprises a rotatable skirt 13 which is surrounded by a bumper 14 and a visible drive wheel 16. In addition, a fixed feed container 17 with a dispensing opening 18 is arranged on top of this part. A feed level meter 8 is placed on the bumper 14 and emits a laser beam 15. In the figure, the feed displacer 3' moves along arrow A and thereby pushes animal feed 4 back to form displaced animal feed 5 along the feeding fence 6.

It can be seen that the rotatable skirt 13, which has the same function as the feed pusher 3 in FIG. 1, pushes back the animal feed 4 to form displaced animal feed 5. It can be seen that the pile of displaced animal feed 5 is higher than the non-displaced animal feed 4. As has been mentioned above, the skirt 13 is rotatable about a shaft (not shown) and may be driven by a motor (likewise not shown) or is driven by contact with the floor. Reference is made to, inter alia, NL-1031605, NL-1034771 and the abovementioned Lely Juno Feed Pusher for particulars regarding this feed displacer with skirt.

Another reason why the pile of displaced animal feed 5 may be higher than that of the non-displaced animal feed 4 is that fresh animal feed may have been poured from the feed container 17 via the dispensing opening 18. Incidentally, this pouring or releasing may be effected in any manner known in the prior art. For details in this regard, reference is made, for example, to the Dutch applications NL-1038426 and NL-1038669 which was not published before the priority date of the present publication and to the Dutch application NL-1038424 which were not published before the priority date of the present application either. These again confirm that providing a feed storage container, that is to say pouring or releasing feed directly, is optional. For example, the animal feed may be displaced and the height thereof measured separately, in order then, and independently, to provide animal feed, for example when there is a risk of a shortage.

The pile of displaced animal feed 5 formed by the feed displacer 3' is measured by the feed level meter 8, which is incidentally situated on the side of the feed displacer 3' facing the feeding fence 6. This feed level meter 8, which is in this case configured as a laser emitting a laser beam 15, measures the height of the pile of displaced animal feed 5. Incidentally, the height meter may also be an ultrasonic meter or mechanical sensor or the like. The height of the feed which has thus been determined can be processed either in a control device (not shown) present on the feed displacer 3' or be transmitted to an external processing device (not shown) by means of a transmission device (likewise not shown).

Figure 4:
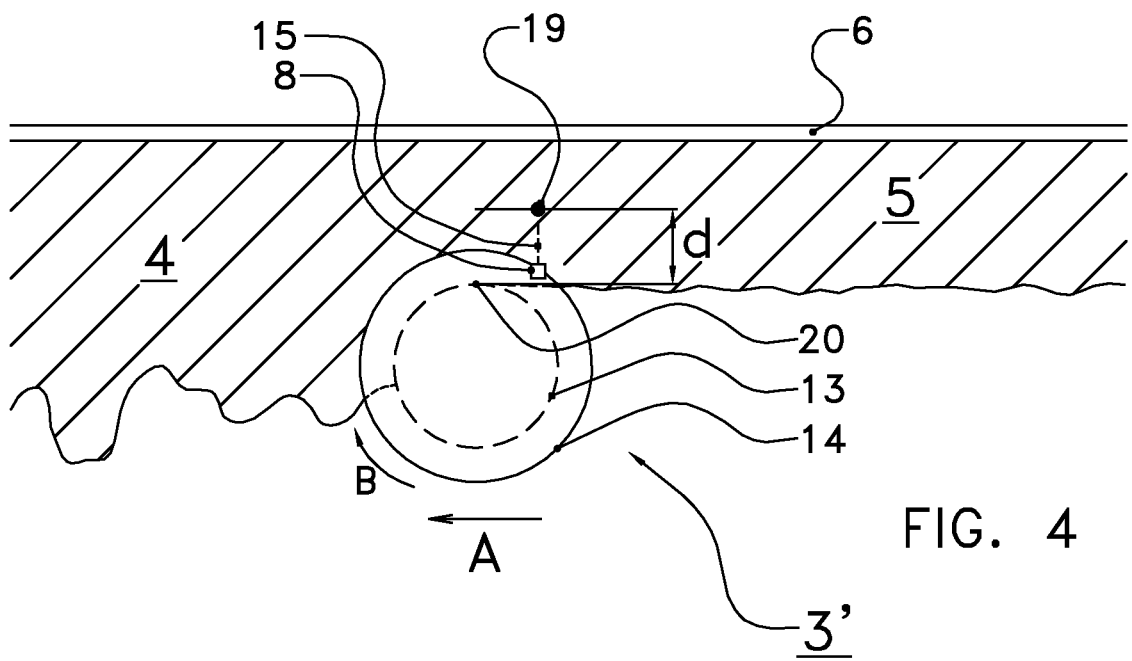
FIG. 4 shows a top view of the feeding system from FIG. 3.

FIG. 4 shows a top view of FIG. 3. Similar components are denoted by the same reference numerals.

It can clearly be seen that the non-displaced animal feed 4 is remodelled into a narrower, higher pile of displaced animal feed 5 by displacement of the feed displacer 3'. This is effected by displacement of the feed displacer 3' along arrow A and by rotation of the skirt 13 in the direction of arrow B. Incidentally, for the sake of clarity, the feed container 17 is not shown in FIG. 4. Furthermore, it is shown that the pile of displaced animal feed 5 "bounces back" slightly from the widest point 20 of the moving skirt 13. For example, if the animal feed consists of hay or the like, a certain degree of bouncing back will occur after displacement.

It can be seen that the feed level meter 8 emits a laser beam 15 to a laser measuring point 19. The laser measuring point 19 is chosen in such a manner that it is situated on or near the highest point of the displaced animal feed 5. To this end, the laser measuring point 19 is situated at a distance d from the widest point 20. In practice, this distance d depends slightly on the distance between the feed displacer 3' and the feeding fence 6 and on the type of animal feed. If the distance between feed displacer 3' and the feeding fence 6 is chosen such that the displaced animal feed 5 is completely accessible to cows, and if the animal feed is grass or a grass product, a distance d of between approximately 15 and 30 cm has been found to be a suitable value in practice. Under different circumstances, as with smaller animals and consequently a smaller pile of displaced animal feed 5, a smaller distance d will suffice, for example.

It can also be seen that, viewed in the intended direction of displacement A, the laser measuring device 8 is situated behind the widest point 20. In theory, the laser 8 may also be placed at the location of the widest point 20 or even slightly before the widest point 20, but this will result in the displaced animal feed 5 not being in equilibrium. On the other hand, it is not desirable to place the laser 8 too far behind the widest point 20, since animals could then already have had the opportunity to displace feed and thereby disturb the regular shape. In practice, a distance of between 0 and 50 cm behind the widest point has been found to be a suitable value.

It should furthermore be noted that the feed displacer 3' shown here is a very specific embodiment of a feed pusher. Obviously, all other autonomously displaceable vehicles with a feed displacement device can fulfil the same function, such as, for example, a vehicle with a fixed pusher (of the snow plough type) or, for example, as disclosed in FR2862489.

Figure 5:
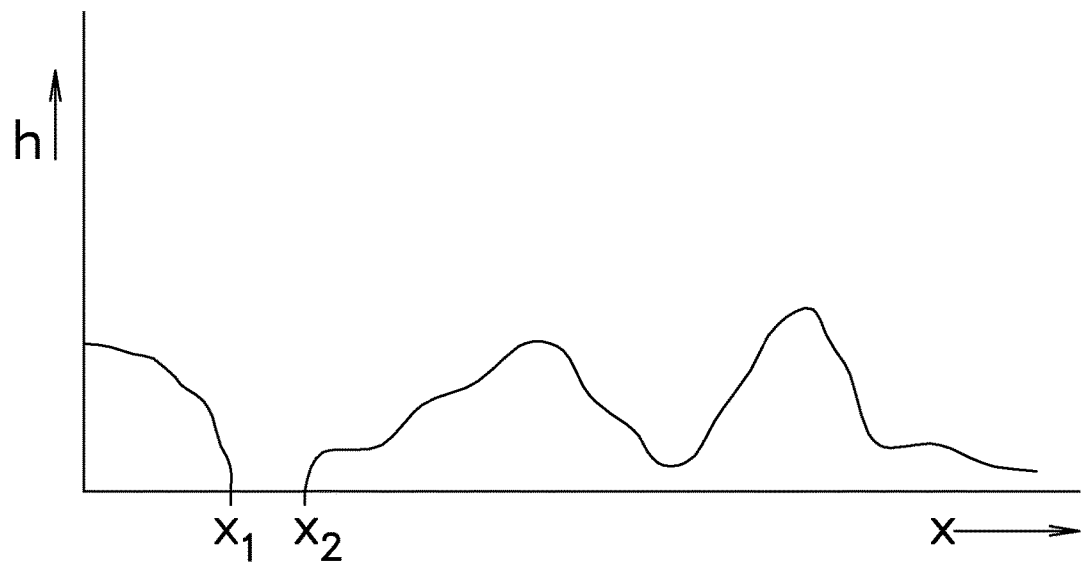
FIG. 5 shows a diagram of a measured feed level profile h as a function of the position x.

FIG. 5 shows a diagram of a measured feed level profile h as a function of the position x. It can be seen that this height h can vary greatly from location to location. Thus, between the locations x1 and x2, the entire feed has been eaten and the measured height equals 0. This may be the result, for example, of a particularly attractive composition of the feed in situ or, for example, of pleasant local climatic conditions in an animal shed or the like. Whatever the case may be, it is possible to adjust the (for example subsequent) feed dose at the location on the basis of the measured feed level profile. For example, the feed dose could be dispensed by means of the feed displacer 3' from FIG. 4. It is then possible to adjust a release speed to the measured feed level profile. This may be effected by actively varying the discharge speed or, for example, by adjusting the travelling speed of the vehicle at a constant release speed from the feed container. For example, the release speed may be greatest between positions x1 and x2 or the travelling speed may be lowest between positions x1 and x2. Conversely, the release speed may be smallest and/or the travelling speed the greatest at peaks in the feed level profile. Thus, it is possible to automatically make up and fill variations in the feed level distribution. Note: in this case, it has been assumed that it is advantageous to achieve a feed distribution which is as even as possible. If a certain non-uniform feed distribution is desired, it is obviously possible to modify the release speed and/or the travelling speed accordingly, in each case on the basis of the measured feed level profile.

Figure 6:
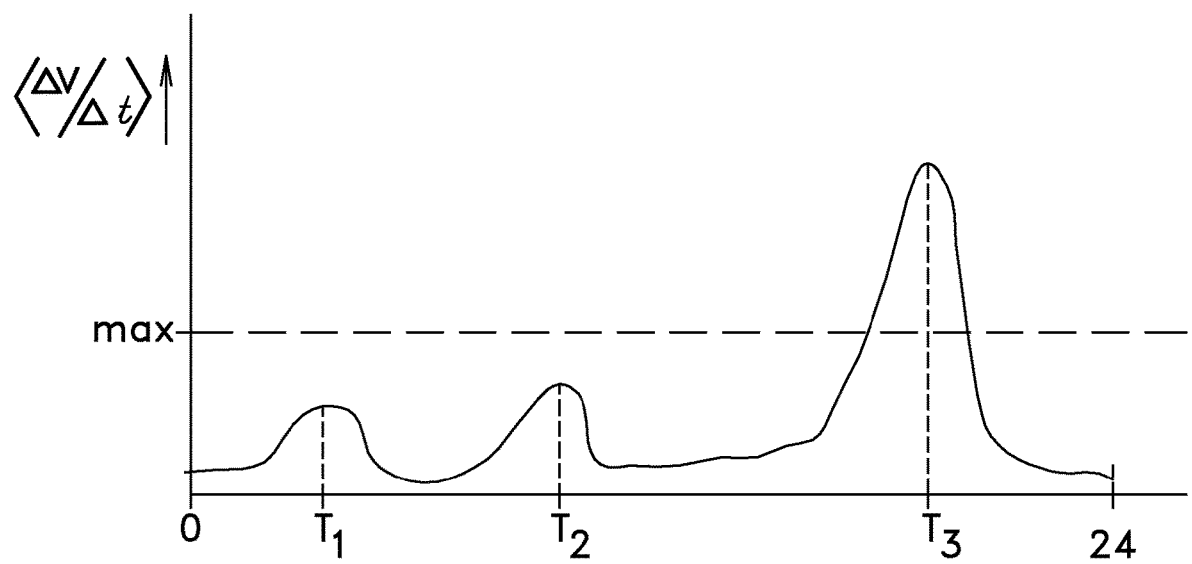
FIG. 6 diagrammatically shows an illustrative profile of the total amount of feed over time.

FIG. 6 diagrammatically shows an illustrative profile of the total amount of feed over time. In this case, an entire 24-hour day is plotted horizontally and the time derivative of the amount of feed is plotted vertically. The amount of feed may in this case have been determined in any known manner, such as by weighing, visual estimation or also on the basis of the feed level measured according to the invention and summing up or integrating across the position.

It will be clear that the changes over time are due to the animals eating the feed. A peak in the change therefore indicates an increased eating activity. The diagram shows three peaks, namely two small ones at $T_1$ and $T_2$, at approximately 6 a.m. and around 12 o'clock midday, and a very large peak around $T_3$, approximately between 6 p.m. and 7 p.m. Obviously, the number, the height and the times of these peaks may vary, but often especially the peak in the evening will be the largest. Furthermore, the maximum supply rate of feed is indicated by a horizontal dashed line in the situation where the animal shed has been measured. Such a speed depends, for example, on the capacity of the feed container of the vehicle from FIGS. 3/4. It is important that this maximum supply capacity is sufficient to keep the amount of feed at a certain level in most cases. Even at the peaks $T_1$ and $T_2$, this supply rate is sufficiently high. However, at peak $T_3$, the supply rate is not sufficiently high. This means that, even at maximum supply, the amount of feed will always drop during this peak. There is therefore the risk of a shortage, for example, when all the feed has been eaten. For the evening peak $T_3$, this problem can be solved by supplying the "missing" amount of feed beforehand, preferably as short a time as possible beforehand. In this case, for example, it suffices to spread out that part of the peak which is above the horizontal dashed "max" line in a period of time which is preferably as short as possible and extends up to the point in time where the course of the speed of consumption intersects the horizontal dashed line. Thus, it is possible to guarantee that there is no feed shortage, even during the evening peak.

The significant advantage of this application of the method and/or device according to the invention is that, in principle, a very small basic feed stock can suffice. This ensures that as little feed as possible is present and therefore a drop in quality can affect only very little feed. The quality as a function over time can therefore be increased. In addition, it is very simple to react in a dynamic way to changes in the speed at which the feed is consumed, the time of consumption, local differences in the amount of feed, etc. In all cases, a high feed quality over time can be ensured. In addition, the feed supply system can also be kept as small as possible, because the supply can be matched exactly, and if a large supply is required, this can be solved by supplying earlier. In addition, it should be noted again here that particularly the simplicity of the system, i.e. only measuring at one location, does not adversely affect the reliability, but clearly improves the simplicity of the system.

The invention claimed is:

1. Feed control system, comprising:
   an autonomous feed displacer which is displaceable in a direction of displacement and which is configured, when passing a site containing animal feed provided on the ground along a feeding fence, to displace said animal feed horizontally over the ground and at right angles to the direction of displacement towards the feeding fence to form a pile of displaced animal feed; and
   a feed level meter operably coupled to the autonomous feed displacer, the feed level meter configured to measure a feed level of said pile of displaced animal feed and to emit a feed level signal on the basis of the measured feed level.

2. Feed control system according to claim 1, wherein the feed level meter is configured to measure the feed level within a predetermined distance and/or time after the feed displacer has passed.

3. Feed control system according to claim 1, wherein the feed level meter is displaceable autonomously along a track, wherein a displacement of the feed level meter is coupled to a displacement of the feed displacer.

4. Feed control system according to claim 1, wherein the feed displacer and the feed level meter form a rigidly connected unit.

5. Feed control system according to claim 1, wherein the feed level meter comprises a series of part meters along a track, wherein in particular the part meters are configured to measure the feed level within a predetermined distance and/or time after the feed displacer has passed.

6. Feed control system according to claim 1, wherein the feed level meter comprises a measuring system for determining the feed level at one point at a time, in particular along a track.

7. Feed control system according to claim 1, wherein the feed level meter is configured to measure the feed level at different points simultaneously in order to determine the greatest height.

8. Feed control system according to claim 1, wherein the feed level meter comprises a laser distance meter.

9. Feed control system according to claim 1, wherein the feed displacer comprises one of a drivable rotatable annular element and a displaceable rigid pusher.

10. Feed control system according to claim 1, wherein the feed level meter is configured and positioned to determine the feed level at a predetermined position with respect to the feed displacer.

11. Feed control system according to claim 10, wherein the feed displacer has a widest point which is configured to come into contact with the animal feed, wherein the predetermined position, as viewed in a plane at right angles to the direction of displacement, is a predetermined distance from the widest point.

12. Feed control system according to claim 11, wherein the predetermined position, viewed along the direction of displacement, is situated at a predetermined distance behind the widest point.

13. Feed control system according to Claim 11, wherein the predetermined distance is between 15 and 30 cm from the widest point.

14. Feed control system according to claim 11, wherein the predetermined position, viewed along the direction of displacement, is situated between 5 and 100 cm behind the widest point.

15. Feed control system according to claim 11, wherein the predetermined position, viewed along the direction of displacement, is situated between 10 and 40 cm behind the widest point.

16. Feed control system according to claim 1, furthermore comprising a control circuit which is configured to process the feed level signal.

17. Feed control system according to claim 16, wherein the control circuit is configured to control a displacement speed of the feed displacer.

18. Feed control system according to claim 1, wherein the feed displacer comprises a bumper, and wherein the feed level meter is arranged on a part of the bumper which extends at least to displaced animal feed when the feed displacer is in use.

19. Feed control system according to claim 18, wherein the bumper extends around the feed displacer.

20. Feed control system according to claim 1, further comprising a feed storage container and a feed-dispensing device, configured to dispense feed from the feed storage container.

21. Feed control system according to claim 16, wherein the control circuit is configured to determine an amount of feed to be dispensed remotely on the basis of the processed feed level signal.

22. Feed control system according to claim 16, wherein the control circuit is configured to determine an amount of feed to be dispensed—on the basis of the processed feed level signal.

23. Feed control system according to claim 16, wherein the control circuit is configured to control a feed-dispensing device so as to dispense the amount of feed to be dispensed remotely.

24. Feed control system according to claim 16, wherein the control circuit is configured to determine an average of the measured feed level and/or of the measured feed level as a function of the position at which measurement has taken place.

25. Feed control system according to claim 1, wherein the autonomous feed displacer is configured, when passing a site containing animal feed provided on the ground, to displace the animal feed by pushing the animal feed.

26. Feeding system, comprising a feed control system according to claim 1, and a feeding fence, wherein the feed control system is configured to move over a track along the feeding fence.

27. Method for feeding animals, comprising displacing animal feed in a direction towards the animals using a feed control system according to claim 1 which moves substantially at right angles to said direction towards the animals, and measuring the feed level of the displaced animal feed within a predetermined distance and/or time after the feed control system has passed.

28. Method according to claim 27, further comprising one or more of the following:
measuring the feed level at one point at a time;
determining the feed level at a predetermined position with respect to the feed displacer of the feed control system; and
emitting a feed level signal on the basis of the measured feed level and processing the feed level signal.

29. Method according to claim 28, wherein the emitting the feed level signal on the basis of the measured feed level and processing the feed level signal is for:
determining an amount of feed to be dispensed, or determining an average of the measured height and/or of the measured feed level as a function of the position at which measurement has taken place.

30. Method according to claim 27, further comprising remotely determining an amount of feed to be dispensed.

31. A feed control system, comprising:
a mobile feed displacer which is configured, when passing a site containing animal feed provided on the ground, to push at least a portion of the animal feed horizontally; and
a feed level meter operably coupled to the feed displacer, the feed level meter configured to measure a feed level of the animal feed displaced by the feed displacer and to emit a feed level signal on the basis of the measured feed level.

32. The feed control system of claim 31, wherein the mobile feed displacer is configured, when passing the site containing animal feed provided on the ground along a length of the animal feed, to decrease a width of the animal feed provided on the ground.

33. A feed control system, comprising:
an autonomous feed displacer which is displaceable in a direction of displacement and which is configured, when passing a site containing animal feed provided on the ground, to displace said animal feed horizontally and at right angles to the direction of displacement; and
a feed level meter operably coupled to the autonomous feed displacer, the feed level meter configured to measure a feed level of the animal feed displaced by the feed displacer and to emit a feed level signal on the basis of the measured feed level,
wherein the feed displacer comprises a bumper that extends around the feed displacer, and wherein the feed level meter is arranged on a part of the bumper which extends at least to displaced animal feed when the feed_displacer is in use.

* * * * *